United States Patent Office 3,488,503
Patented Jan. 6, 1970

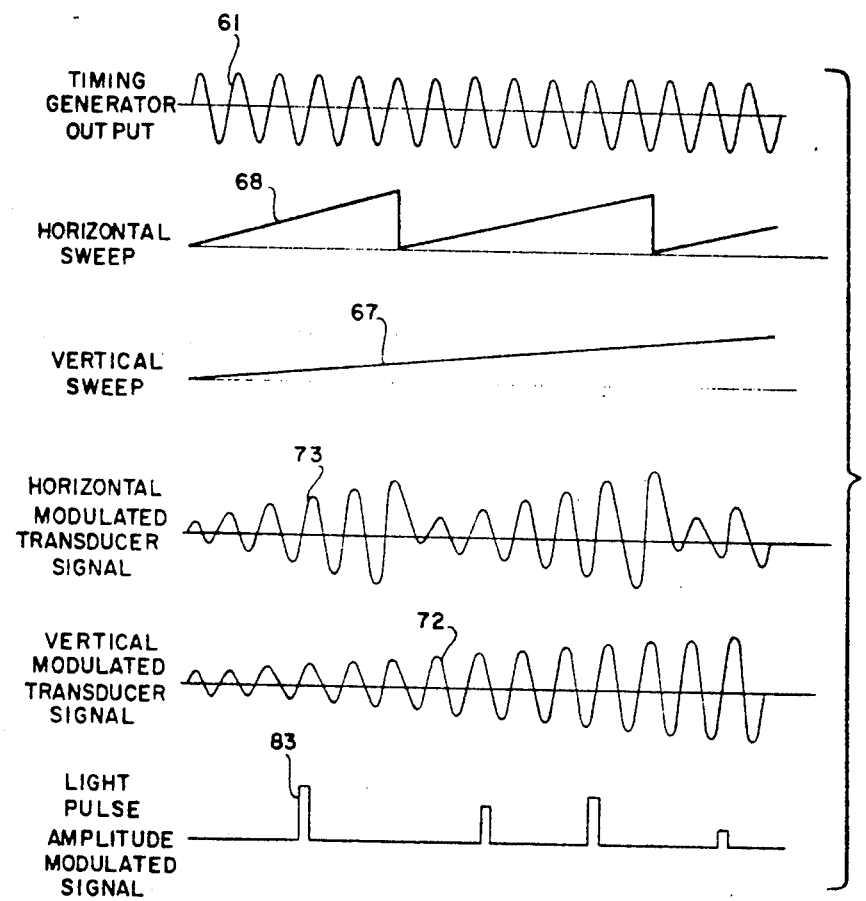
FIG_4

---

3,488,503
ACOUSTIC LIGHT SCANNER AND DISPLAY SYSTEM
Abraham Reich, Metuchen, Richard Lipnick, Scotch Plains, and Gerald A. Schoen, Califon, N.J., assignors to Lockheed Aircraft Corporation, Burbank, Calif.
Filed Apr. 19, 1965, Ser. No. 449,125
Int. Cl. H04b 9/00
U.S. Cl. 250—199
11 Claims

ABSTRACT OF THE DISCLOSURE

A beam of coherent electromagnetic energy is intensity modulated in response to an electrical input signal and controllably deflected by refraction in an acoustic scanner driven by sweep voltages generating in-phase acoustic waves about two orthogonal axes generally normal to the beam and synchronized with the input signal. The resultant refracted energy beam is projected onto a screen to create a pictorial display based on the information contained in the electrical input signal.

---

Figure 1:
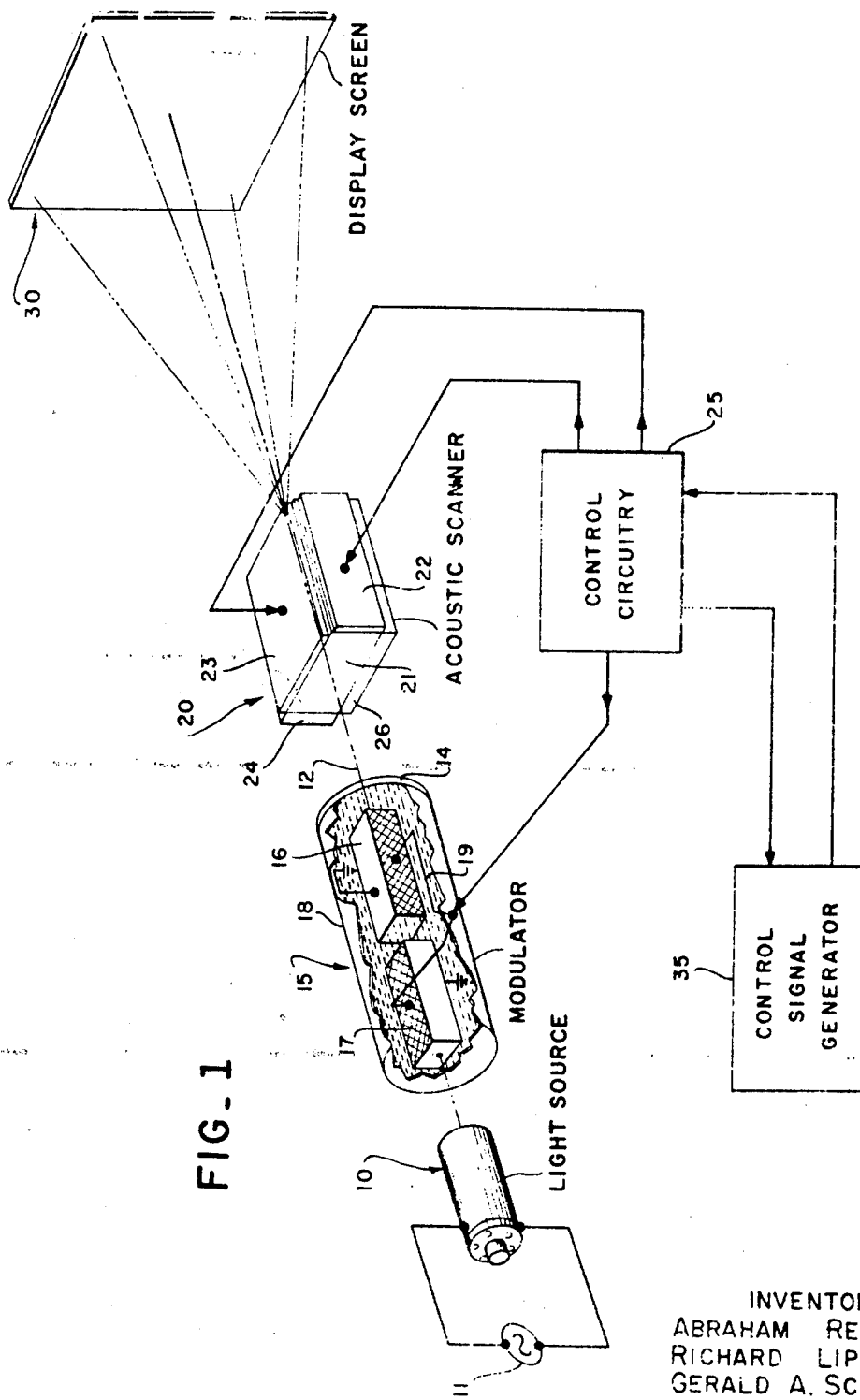

This invention relates generally to information display devices and more particularly to an acoustic scanner for controllably bending a narrow beam of electromagnetic energy such as a coherent light beam for observation or recording purposes and the like.

Basically, the invention involves periodically varying the refractive index of an optically transparent medium by acoustic waves, which thus scan the light beam passing through the medium.

In practice, mechanical vibrations at the frequency of an impressed voltage are transmitted to the optically transparent medium, establishing periodic variations in the density of the medium. This density variation produces a constantly varying change in the index of refraction ($n$) of the medium. A light beam, such as a spatially coherent light beam from a laser, of beamwidth significantly smaller than the wavelength of the acoustic waves in the medium, is bent periodically in phase with the variations in refractive index. The beam is bent into the region of greater refractive index with a radius $r$, where:

$$r = \frac{n}{dr/dx} \quad (1)$$

If the pressure wave is sinusoidal and $dn/dx$ is small and continuous, it can be shown that the deflection expected at a display screen is:

$$d = \frac{4\pi a S k}{6n^2 \lambda_s}(n^2-1)(n^2+2)P \quad (2)$$

where $a$=midpoint of scanner to screen; $S$=optical path length in scanner; $k$=compressibility of the acoustic medium; $n$=refractive index of scanner medium; $P$=acoustic wave pressure in scanner medium; and $\lambda_s = V/f_o$=acoustic wavelength.

Mechanization of Equation 2 above to produce bending of a light beam in two dimensions as taught herein provides the basis for a novel and versatile information display system capable of operating, for example, in either television raster or flying spot scanner modes. Using a television type raster, the system can be made to operate at various sweep frequencies so that the size of the raster, as well as its number of resolution elements, can be tailored to particular display requirements.

A principal object of this invention is to provide an acoustic scanner for controllably bending a light beam in two dimensions. When two orthogonal acoustic beams are intersected by a light beam in the scanner, they act independently on that beam. Thus, the beam may be deflected in both horizontal and vertical directions simultaneously. When the two acoustic waves are at the same frequency and out of phase by 90 degrees, a circle is the mapping. When the waves are at the same frequency and are in phase, the resultant mapping is a line, the slope of the line being a function of the relative amplitude of the waves and the magnitude of beam deflections (length of the line) being a function of the resultant acoustic wave amplitude.

Another object of this invention is to provide a display device especially suited to use of laser light sources and which is substantially insensitive to environmental conditions.

Another object of this invention is to provide an acoustic scanner for controllably bending a light beam wherein the deflection repetition rate of the light beam is independent of the scanner driving signal frequency up to the megacycle frequency region.

Still another object of this invention is to provide a display device having frequency bandwidth response from direct current to the megacycle region.

Further and other objects will become apparent from a reading of the following description, especially when considered in combination with the accompanying drawing wherein like numerals refer to like parts.

Figure 2:
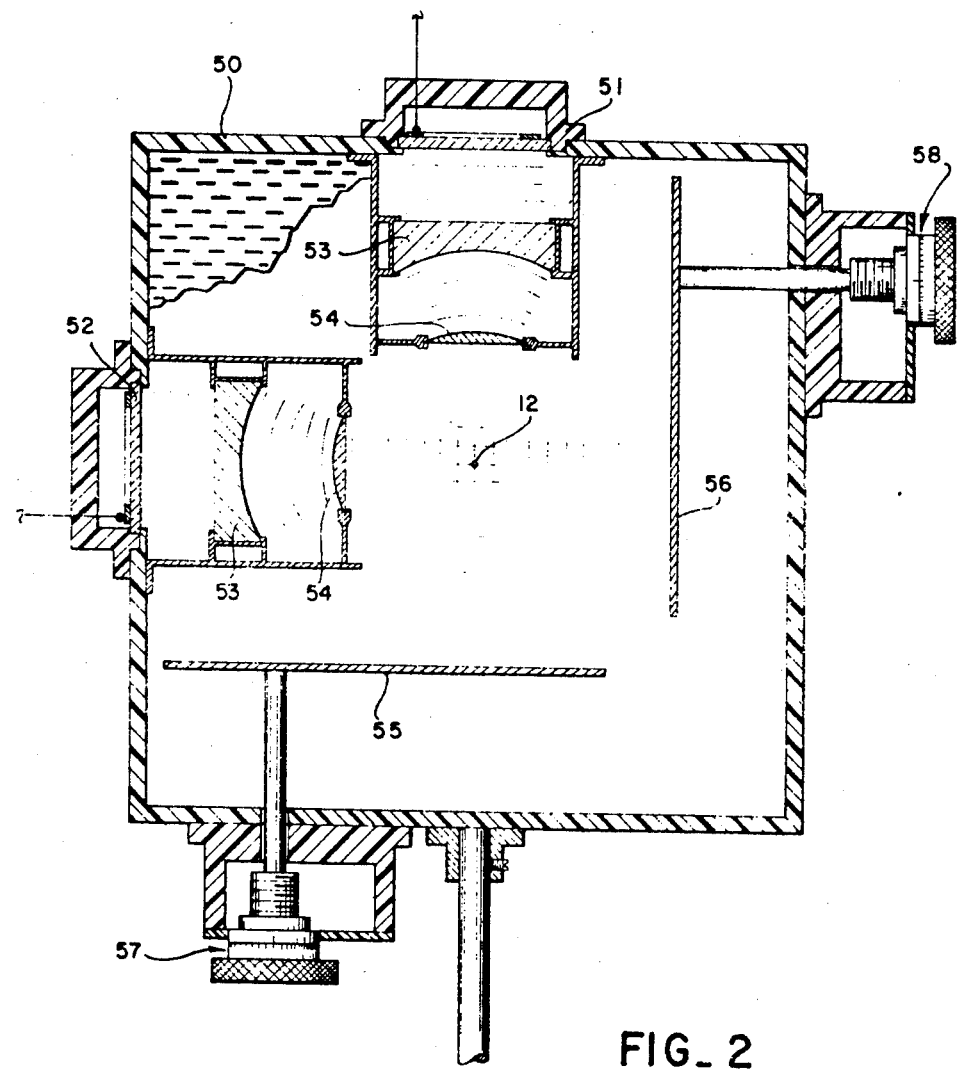
Figure 3:
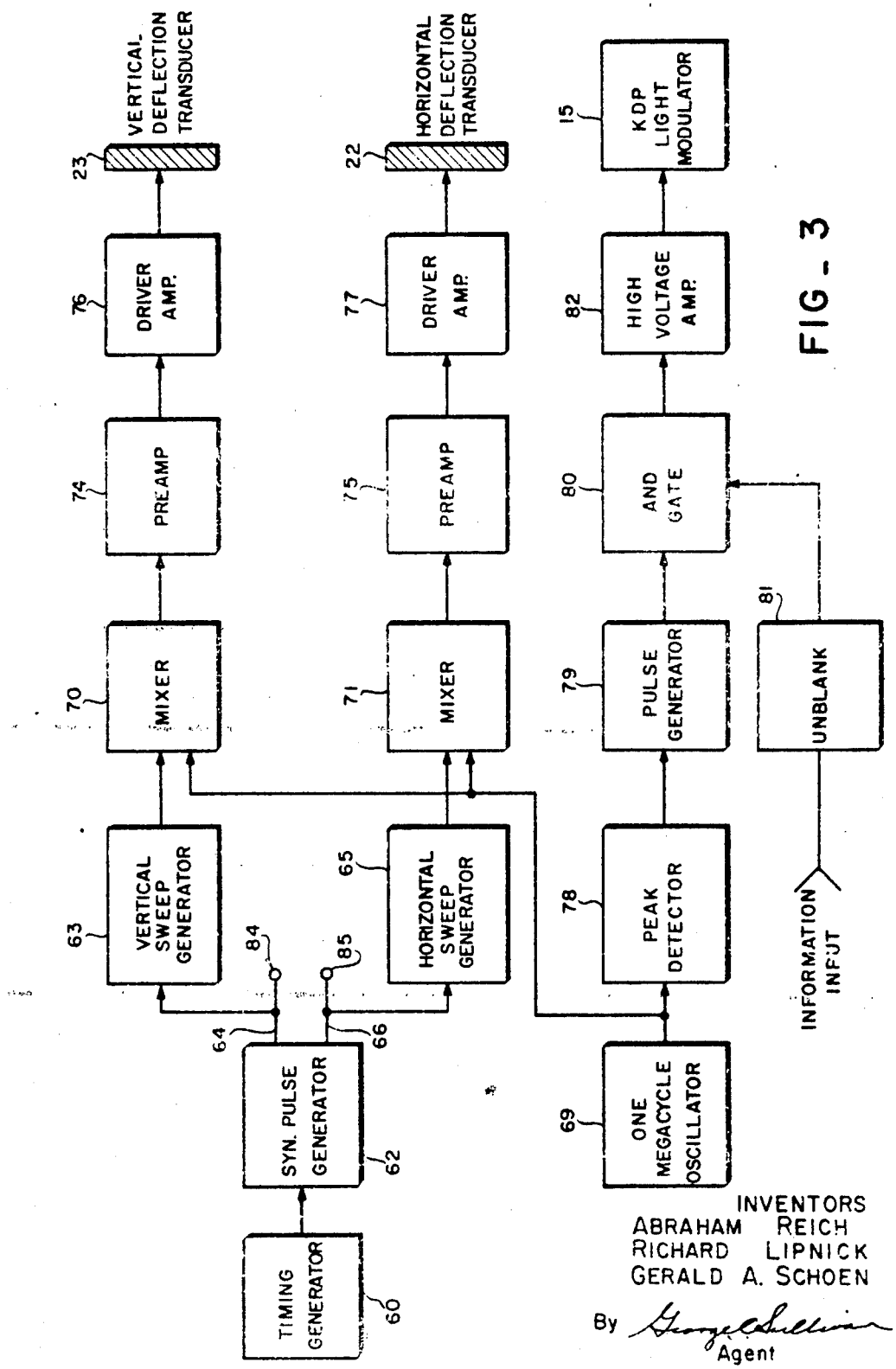

In the drawing:
FIGURE 1 is a perspective view showing the information display system of this invention;
FIGURE 2 is a sectional view showing a modified form of acoustic scanner for the FIGURE 1 display system;
FIGURE 3 is a block diagram showing typical electronic control circuitry for the display system;
FIGURE 4 is a presentation illustrating the waveform and timing for the FIGURE 3 control circuitry.

Referring to FIGURE 1, the display device includes a light source 10, a light pulse amplitude modulator 15, a two dimensional acoustic scanner 20, associated electronic control circuitry 25 and a suitable information display screen 30. The data or information is fed into the system through control circuitry 25 by a suitable control signal generator 35 which may take the form of a television camera and signal transmitter station, a memory storage and electronic readout system such as commonly used in connection with conventional trainer and simulator display systems, or the like.

Light source 10 is preferably of the optical maser or laser type providing a high intensity, narrow beam of electromagnetic energy having spectral purity and unidirectionality of emitted radiation. While mercury lamps are suitable for use in the system herein described, the spatial coherence (and hence the collimation) in a laser source is far better. Disregarding lasers that require external optical pumping, optical masers fall into two general categories, namely, solid-state or injection lasers and gaseous lasers. Each type has its own advantages and disadvantages; however, considering the present state of the laser art for purposes herein described, gaseous lasers are considered preferable and, in particular, the helium-neon laser which emits at $4.74 \times 10^{14}$ cycles per second, corresponding to 6328 angstroms. Such lasers are commercially available. These would include the Perkin-Elmer Spectraphysics Model 112, a five milliwatt helium-neon laser and the Perkin-Elmer Model 5200, a 0.2 milliwatt helium-neon laser. The frequency of emitted radiation from these lasers is in the visible portion of the spectrum. Lasers emitting at frequencies different from the above helium-neon laser within the light spectrum, whether visible or invisible, would obviously be useful in the device of this invention for particular applications of the basic acoustic scanner device described herein and a typical example would be in displaying color-coded data through the use of lasers emitting at frequencies corresponding to the desired light color, i.e., yellow, green, blue, etc.

Light source 10 may be driven by any conventional means suited to the particular type of light source being employed. In FIGURE 1 there is shown, for illustrative purposes, an alternating current generator 11 coupled to the light source for supplying the necessary energy to produce the light beam represented by construction line 12.

The display system herein disclosed requires the light beam to be rapidly modulated or switched on and off at discrete time intervals to display information through beam positioning and preferably in some cases also through contrast. There are presently several different types of light modulators available which are suitable for use with the acoustic scanner and display system. Perhaps the most commonly used modulators at the frequencies of interest here are potassium dihydrogen phosphate (KDP) crystals, operating by virtue of the Pockels effect. Such a modulator, available from Westinghouse, Inc., for example, is schematically illustrated in the system of FIGURE 1 where KDP crystals 16 and 17 are suitably mounted in an oil-filled enclosure 18 so that the light beam may pass through both crystals in the modulator. The electro-optic coordinate systems of the two crystals are oriented orthogonally. When the proper voltage is applied to the crystals through lead 19, each crystal will produce a quarter wave retardation and hence, a polarization rotation of 45 degrees to any incoming light. Since the crystals are orthogonal, the net rotation of the light is 45 degrees plus 45 degrees, or 90 degrees. A lesser voltage will produce lesser retardation, generally proportional to the magnitude of the applied voltage. By placing a polarization analyzer 14 at the output of the modulator, the light beam from source 10 can be gated on and off or modulated as desired, allowing the device to function as an electro-optic shutter which is normally closed. Such modulators have optical frequency responses from about 4000 angstroms to about 14,000 angstroms wavelength, with light transmissions of up to eighty percent (80%).

There are various other types of electro-optic light modulators which would be suitable in the system described herein; one such modulator is described in U.S. Patent No. 3,133,198. Another is described in the September 1963 issue of the Proceedings of the Institute of Electronic Engineers at page 1258 in an article written by D. Angelus and Niblack entitled "Electro-Optic interference Filter Light Modulator." Yet another technique for microwave modulation of light which would be suitable in the system is disclosed in the December 1963 issue of Proceedings of the Institute of Electrical and Electronic Engineers at pages 1776 and 1777 in an article by Eden and Colman entitled "Proposal for Microwave Modulation of Light."

Light beam 12 emerging from modulator 15 is directed through acoustic scanner 20 which, in the form shown in FIGURE 1, consists essentially of a quartz block 21 with two barium titanate transducers 22 and 23 mounted on adjoining orthogonal faces of the quartz block, electrically isolated from each other. On the other two faces, acoustic absorbers 24 and 26 are mounted. Each barium titanate transducer is cut for its own frequency range of operation. The acoustic waves propagate orthogonally to each other. The light beam is positioned along the line of intersection of the two acoustic beams and the acoustic beams exert their effects upon the light beam independently of each other. The light beam is deflected in two orthogonal directions and the result at the viewing screen 30 is a two dimensional deflection. If desired, the quartz block end face, through which the deflected light beam issues, can be formed as a negative lens for use in amplifying the deflection of the beam.

If the titanate transducers are subjected to electric waves amplitude modulated by synchronized sawtooth waveforms, the frequency of one sawtooth wave form being much higher than that of the other, a raster will be swept out at the viewing screen as in the cathode ray tube of a television display monitor. If, in addition, the light beam is intensity modulated in synchronism with the raster, then the heart of a novel display system is provided.

When a compressional acoustic disturbance is set up in the quartz by means of the barium titanate transducer, it propagates at $5.7 \times 10^5$ centimeters per second. With a representative acoustic frequency of 500 kilocycles (this can be scaled up or down quite widely), the acoustic wavelength in the quartz medium is:

$$\frac{5.7 \times 10^5 \text{ centimeters per second}}{5 \times 10^5 \text{ cycles per second}} = 1.14 \text{ centimeters} =$$

11.4 millimeters

If a laser light beam of 0.1 millimeters is being considered the acoustic wavelength (of the 500 kc. disturbance) is about 114 times the laser beam cross section. The entire cross section of the light beam thus encounters, at any instant, fairly uniform acoustic phase as it travels the acoustic beam. This is significant to system performance. The wavelength of the acoustic waves must be longer than the light beamwidth and should preferably be on the order of 8 or more times the beamwidth of the light beam. The higher the ratio of acoustic wavelength to light beamwidth, the better will be the resolution and the bending process.

As the acoustic beam propagates in the quartz medium, the laser beam impinges upon it normal to the acoustic propagation. Since the light beam remains stationary and the acoustic beam propagates, the conditions witnessed by the light beam change each instant. An acoustic disturbance in the transparent medium gives rise to a varying index of refraction in the medium. That is, if the direction of acoustic propagation is X, there will be a changing index of refraction $dn/dx$, where $n$ is the index of refraction of the quartz.

The varying index of refraction causes the laser light beam to bend. It will bend (refract) into the direction of greater index at each moment. The acoustic antinodes represent regions of greater acoustic pressure and of larger refractive index than the nodes. The beam will therefore bend toward the higher index (antinodes) and away from the lower index (nodes), much as a light beam is refracted when it leaves a medium such as air and enters glass. If the acoustic disturbance is sinusoidal, the light beam will find the index varying in one direction, but by a continuously varying amount, for part of the acoustic cycle. It will then witness a changing index in the opposite direction. The beam will therefore deflect in one direction from the optical axis, reach a maximum within a quarter acoustic cycle and deflect back to the axis in the next quarter cycle. The second half cycle will find the beam bending in like manner on the opposite side of the optical axis. The amount of deflection of the light beam will depend upon the functions of Equation 2 above and mainly upon the amplitude or acoustic wave pressure in the scanner medium.

The use of quartz as the acoustic scanner medium is only representative. While the arrangement described can handle large acoustic power levels without deleterious thermal or mechanical consequences, the propagating medium itself is selected as a good compromise of the desired optical, acoustic, thermal and mechanical properties. Acoustic scanners employing water, plastics, transparent liquids, etc. may be employed, depending upon the frequency range of operation, the acoustic power levels desired, and the impedance match between transducer and propagating medium. In water, for example, the velocity of propagation of the acoustic wave is approximately $1.5 \times 10^5$ centimeters per second, as compared with $5.7 \times 10^5$ centimeters per second for quartz. Where a high acoustic wave frequency in the one megacycle range, for example, is desired, quartz would be preferable to water as the acoustic wave medium. This would also dictate a light beamwidth in the order of one millimeter to hold a desired ratio of acoustic wavelength to the light beamwidth.

A typical acoustic scanner using water as the acoustic wave propagating medium is illustrated in FIGURE 2. A water-filled container 50, which is generally transparent to the light beam 12 passing therethrough carries two orthogonally arranged piezoelectric transducers 51 and 52. These transducers 51 and 52 may preferably be of a material such as quartz mounted in suitable openings formed in the wall of the container so as to be contiguous with the liquid. When subjected to an energizing signal of selected frequency, the vibrations of the transducers will be transmitted to the water medium, setting up acoustic waves in the medium which will propagate therethrough at a velocity of approximately $1.5 \times 10^5$ centimeters per second. To increase the intensity of the acoustic wave, a focusing system of optical lenses 53 and 54 may be employed in connection with each transducer 51 and 52, thus increasing the resulting acoustic wave pressure P in the scanner medium and hence, in accordance with the relationships of Equation 2 above, increase the deflection of the light beam. The net angular deflection of the light beam can be increased still further such as by use of conventional divergent optical lens systems.

Either acoustic absorbers like 24 and 26 in FIGURE 1 or standing wave reflectors 55 and 56 as shown may be provided within the container; the standing wave reflectors serving to produce reflections which are in phase with the propagated acoustic waves. These standing wave reflectors are adjustable through micrometer heads 57 and 58 for phase control.

Where a liquid such as water is used as the acoustic wave propagating medium, it may be desirable to pressurize container 50 to avoid cavitation. The cavitation threshold pressure is an exponential function of frequency; by pressurizing the liquid in the container, the acoustic wave frequency may be increased commensurate with the increase in the cavitation threshold.

The size and type of acoustic scanner including the selection of the acoustic scanning medium depend upon the particular requirements of a specific display system with respect to the desired light beam deflection angle and system resolution. On the other hand, there are no special requirements for display screen 30. Since laser light beams of high intensity are available, where such lasers are employed in the system, active screens would not be necessary. An ordinary white projection screen is adequate; however, active screens may of course be employed as a matter of choice for such purposes as increasing the contrast level of the information presented at the screen.

The electronic circuitry required for the display system to operate in a mode generating a television type raster is shown in FIGURE 3. The waveform and timing requirements of the electronic control circuitry are shown in FIGURE 4. Referring now particularly to FIGURE 3, there is included a timing generator 60 producing a generally sign wave output 61 as indicated in FIGURE 4. The output of the timing generator is applied to a counter and sync pulse generator 62 which provides synchronizing pulses to vertical sweep generators 63 through lead 64 and to horizontal sweep generator 65 through lead 66. The output waveforms 67 and 68 of the vertical and horizontal sweep generators as shown in FIGURE 4 provide, for example, a horizontal sweep rate of 45,000 cycles per second and a vertical sweep rate of 60 cycles per second. An oscillator 69 operating at the desired acoustic frequency of, say, one megacycle, has its output applied to mixers 70 and 71 in the vertical and horizontal sweep circuits, respectively. The outputs of sweep generators 63 and 65 are likewise applied to mixers 70 and 71 and mixed with the one megacycle oscillator output to produce horizontal and vertical sweep circuit amplitude-time varying driving signals. The outputs of mixers 70 and 71 are shown in FIGURE 4 as the modulated transducer signals 72 and 73. These modulated transducer signals serve as driving signals for the acoustic scanner vertical and horizontal deflection transducers (transducers 22 and 23 in FIGURE 1 and transducers 51 and 52 in FIGURE 2). To raise the power level of the modulated transducer signals attained at the output of mixers 70 and 71, they are suitably amplified as indicated in FIGURE 3 in preamplifiers 74 and 75 and driver amplifiers 76 and 77. The output impedance of each driver amplifier 76 and 77 is matched to the transducer impedance for maximum power transfer. The two channels (horizontal and vertical) are matched so there is no phase difference between their outputs.

In a flying spot scanner display is desired, the sweep rates give way to direct current voltages which essentially hold the deflected light beam at particular points on the display screen by voltage level control. All other circuits are the same as those described above for the television type raster display system.

To control the light beam amplitude for presenting the desired information at the display screen, light modulator 15 is synchronized to the transducer driving signal by coupling to the output of oscillator 69 through peak detector 78 and pulse generator 79. The output of pulse generator 79 is applied to an "and" gate 80. When a desired display element is to be put on the screen, unblank circuit 81 is initiated, which gates on the high voltage amplifier 82 and hence, the light source. Pulses 83 in FIGURE 4 illustrate the resulting amplitude modulated signal applied to light modulator 15 wherein the amplitude of these pulses establishes the intensity of the light beam at the screen.

The information input to unblank circuit 81 is identified in FIGURE 1 as control signal generator 35. This may take the form of an information controlled pulse generator of the type used in prior art trainer display systems keyed to the sweep circuits for presenting target position data at the display screen. On the other hand, where word or pictorial data is to be presented, the control signal generator might take the form of a television type camera synchronized to the display sweeps such as by connection at 84 and 85 in FIGURE 3 to the output of sync pulse generator 62.

Operation of the display system involves essentially gating or modulation of the light source in synchronism with the driving signal applied to the acoustic scanner transducers, where the gating of the light beam is controlled by the information input. Thusly, information in the form of an electrical signal is converted by electro-optic means into a controlled light beam and projected onto a display plate or screen for observation or recording. In this connection, it will of course be recognized that the basic electro-optic arrangement shown herein of a modulated light source and an acoustic scanner for controllably bending the light beam may be utilized in various forms and in many different types of information display and recording systems. Accordingly, it is to be understood that many alterations, modifications and substitutions may be made within the spirit and scope of the appended claims without departing from the teachings of this invention.

We claim:
1. An acoustic scanner for controllably deflecting a beam of coherent light comprising, a light transmissive acoustic wave propagating medium through which the light beam may pass, a signal generator means, and a pair of transducers coupling said signal generator means to said medium for producing in said medium a pair of intersecting acoustic waves generally orthogonally disposed with respect to each other transversely of said energy beam, said acoustic waves each having a wavelength substantially greater than the light beamwidth and an amplitude proportional to the desired beam deflection angle.

2. An acoustic scanner as defined in claim 1 wherein the light transmissive acoustic wave propagating medium is quartz.

3. An acoustic scanner as defined in claim 1 wherein the light transmissive acoustic wave propagating medium is a fluid and the transducers are of a piezoelectric material.

4. An information display device comprising, source means generating a beam of coherent light, remote display means arranged to receive the light beam, an acoustic wave propagating medium transmissive to said light beam and intercepting said beam between said source means and said display means, piezoelectric transducer means coupled to said medium for producing therein a pair of intersecting acoustic waves generally orthogonally disposed with respect to each other transversely of said beam, said acoustic waves each having a wavelength substantially greater than the light beamwidth and an amplitude proportional to the desired beam deflection angle, and means for amplitude modulating the light beam.

5. A display device as defined in claim 4 wherein the acoustic wave propagating medium is a solid.

6. A display device as defined in claim 5 having acoustic wave absorbers wherein the acoustic wave propagating medium is quartz sandwiched between the absorbers and the piezoelectric transducer means.

7. A display device as defined in claim 4 wherein the acoustic wave propagating medium is a liquid.

8. A display device as defined in claim 7 having standing wave reflector means arranged oppositely of said transducer means and spaced therefrom for passage therebetween of said light beam in said medium.

9. An information display device comprising, an optical maser for continually generating a narrow beam of coherent light energy, remote display means arranged to receive the light beam, light transmissive acoustic scanning means intercepting said light beam between said optical maser and said display means, said acoustic scanning means being responsive to a plurality of physical inputs producing intersecting acoustic wave transversely intersecting said light beam for refraction bending said beam proportional to the magnitude of the physical inputs, means for amplitude modulating the light beam, and control means responsive to an information input and coupled to the last mentioned means for modulating beam intensity at said display means.

10. An information display device comprising, an optical maser for generating a continuous narrow beam of coherent light energy, remote display means arranged to receive the light beam, a light transmissive acoustic scanning medium intercepting said light beam between said optical maser and said display means, transducer means coupled to said acoustic scanning medium, means coupled to said transducer means and generating intersecting in-phase orthogonal acoustic waves in said acoustic scanning medium transversely intersecting said light beam, the magnitude of said acoustic waves being proportional to the magnitude of beam deflection, means for intensity modulating the light beam, information input control means coupled to the last-mentioned means for modulating beam intensity in response to the information input, and circuit means synchronizing the modulation of beam intensity and the generation of acoustic waves.

11. An information display device comprising, means for generating a narrow beam of coherent light energy, remote display means arranged to receive the light beam, a light transmissive acoustic scanning medium interposed in the path of said beam, transducer means coupled to said acoustic scanning medium, electrical waveform generating means coupled to said transducer means for producing intersecting in-phase acoustic waves in said acoustic scanning medium transversely intersecting said light beam, the magnitude of said acoustic waves being proportional to the magnitude of beam deflection, modulator means for intensity modulating the light beam in response to an applied signal, detector means coupled to said electrical waveform generating means and detecting signal waveform level to provide a pulsating output, and circuit means connecting with said modulator means and responsive to said detector means output for synchronizing the modulation of beam intensity with the generation of acoustic waves.

References Cited

UNITED STATES PATENTS

| | | |
|---|---|---|
| 3,314,073 | 4/1967 | Becker. |
| 3,363,056 | 1/1968 | Dunlap _____ 250—199 XR |
| 2,797,619 | 7/1957 | Rosenthal. |
| 3,297,876 | 1/1967 | de Maria _____ 250—199 |
| 3,306,977 | 2/1967 | Brueggemann _____ 178—6 X |

RICHARD MURRAY, Primary Examiner

ALBERT J. MAYER, Assistant Examiner